United States Patent
Takeuchi et al.

(10) Patent No.: US 10,320,520 B2
(45) Date of Patent: Jun. 11, 2019

(54) COMMUNICATION DEVICE, SYSTEM AND METHOD

(71) Applicant: Hitachi, Ltd., Chiyoda-ku, Tokyo (JP)

(72) Inventors: Takashi Takeuchi, Tokyo (JP); Ryosuke Fujiwara, Tokyo (JP)

(73) Assignee: Hitachi, Ltd., Tokyo (JP)

(*) Notice: Subject to any disclaimer, the term of this patent is extended or adjusted under 35 U.S.C. 154(b) by 338 days.

(21) Appl. No.: 15/035,569

(22) PCT Filed: Nov. 15, 2013

(86) PCT No.: PCT/JP2013/080862
§ 371 (c)(1),
(2) Date: May 10, 2016

(87) PCT Pub. No.: WO2015/072005
PCT Pub. Date: May 21, 2015

(65) Prior Publication Data
US 2016/0294508 A1  Oct. 6, 2016

(51) Int. Cl.
*H04L 1/00* (2006.01)
*H04L 29/06* (2006.01)
*H04L 15/00* (2006.01)

(52) U.S. Cl.
CPC ............ *H04L 1/0041* (2013.01); *H04L 1/007* (2013.01); *H04L 1/0009* (2013.01);
(Continued)

(58) Field of Classification Search
CPC ..... H04L 1/0041; H04L 1/0009; H04L 1/007; H04L 1/0073; H04L 1/0075; H04L 69/22; H04L 1/0026; H04L 1/0079
See application file for complete search history.

(56) References Cited

U.S. PATENT DOCUMENTS 6,490,705 B1 * 12/2002 Boyce .................... H04N 19/66
375/E7.088
6,804,237 B1 * 10/2004 Luo ...................... H04L 12/6418
370/392
(Continued)

FOREIGN PATENT DOCUMENTS

JP  2004-171206 A  6/2004
JP  2006-157525 A  6/2006
(Continued)

OTHER PUBLICATIONS

International Preliminary Report on Patentability (PCT/IB/338 & PCT/IB/373) issued in PCT Application No. PCT/JP2013/080862 dated May 26, 2016, including English translation of document C2 (Japanese-language Written Opinion (PCT/ISA/237)) previously filed on May 10, 2016 (6 pages).
(Continued)

*Primary Examiner* — April Y Blair
*Assistant Examiner* — Dipakkumar B Gandhi
(74) *Attorney, Agent, or Firm* — Crowell & Moring LLP

(57) ABSTRACT

Provided is a method for effectively suppressing packet losses by burst losses without an increase in delay by adaptively or fixedly changing a size of an FEC encoded block even when the number of packets per unit time is small. Each communication device 101 includes a transmitting unit 102 and a receiving unit 103. The transmitting unit 102 has a function of calculating forward error correction (FEC) codes based on the number of packets per encoding time and a value of a burst loss time of a network line. The receiving unit 103 decodes an FEC encoded packet and measures line quality information of the network for transmission to the transmitting unit 102. The transmitting unit 102 transmits the packets at equal intervals for as long as it is required for encoding, and can change a system for
(Continued)

calculating FEC based on the burst loss time and the encoding time.

15 Claims, 8 Drawing Sheets

(52) U.S. Cl.
CPC .......... *H04L 1/0073* (2013.01); *H04L 1/0075* (2013.01); *H04L 69/22* (2013.01); *H04L 1/0026* (2013.01); *H04L 1/0079* (2013.01)

(56) References Cited

U.S. PATENT DOCUMENTS

| | | | |
|---|---|---|---|
| 6,970,935 B1* | 11/2005 | Maes ................ | H04L 29/06027 370/356 |
| 7,228,550 B1* | 6/2007 | Eberhard ................ | G06F 9/544 709/231 |
| 8,074,054 B1* | 12/2011 | Rangavajjhala .... | G06F 15/8015 712/28 |
| 8,266,492 B2 | 9/2012 | Gondo et al. | |
| 2004/0086051 A1* | 5/2004 | Mizoguchi ......... | H04N 21/2365 375/240.28 |
| 2004/0095950 A1 | 5/2004 | Shirogane et al. | |
| 2005/0078666 A1* | 4/2005 | Beshai .................... | H04L 45/62 370/380 |
| 2005/0193317 A1* | 9/2005 | Chen ................. | H03M 13/2903 714/758 |
| 2005/0251726 A1* | 11/2005 | Takamura ......... | H03M 13/2707 714/755 |
| 2006/0050742 A1 | 3/2006 | Grandhi et al. | |
| 2006/0056403 A1* | 3/2006 | Pleasant .................... | G06F 1/14 370/389 |
| 2006/0279437 A1* | 12/2006 | Luby ................. | H03M 13/1515 341/50 |
| 2007/0162819 A1* | 7/2007 | Kawamoto .......... | H04B 7/0854 714/758 |
| 2007/0195707 A1* | 8/2007 | Cidon ..................... | H04L 43/50 370/252 |
| 2008/0151776 A1* | 6/2008 | Kure ..................... | H04L 1/0007 370/253 |
| 2009/0249421 A1* | 10/2009 | Liu ..................... | H04L 12/2801 725/116 |
| 2009/0282467 A1* | 11/2009 | Schenk ................... | H04L 63/10 726/7 |
| 2010/0023842 A1* | 1/2010 | Rahrer ............. | H03M 13/3761 714/776 |
| 2010/0202309 A1 | 8/2010 | Suneya | |
| 2012/0039194 A1* | 2/2012 | Kure ..................... | H04N 19/30 370/252 |
| 2012/0290642 A1* | 11/2012 | Shaughnessy ...... | H04L 67/2823 709/203 |

FOREIGN PATENT DOCUMENTS

| | | |
|---|---|---|
| JP | 2007-74152 A | 3/2007 |
| JP | 2007-324876 A | 12/2007 |
| JP | 2008-510380 A | 4/2008 |
| JP | 2008-160499 A | 7/2008 |
| JP | 2009-60513 A | 3/2009 |
| JP | 2010-183439 A | 8/2010 |

OTHER PUBLICATIONS

International Search Report (PCT/ISA/210) issued in PCT Application No. PCT/JP2013/080862 dated Jan. 21, 2014 with English translation (5 pages).
Japanese-language Written Opinion (PCT/ISA/237) issued in PCT Application No. PCT/JP2013/080862 dated Jan. 21, 2014 (4 pages).
Japanese-language Office Action issued in counterpart Japanese Application No. 2015-547345 dated Jun. 13, 2018 with English translation (five (5) pages).

* cited by examiner

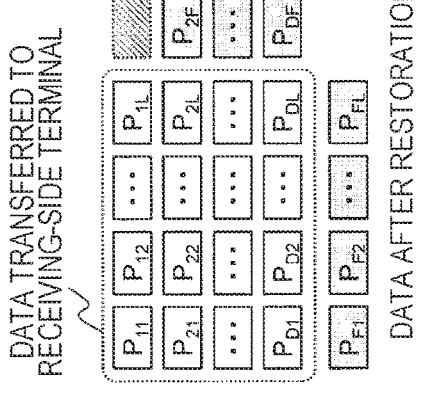
FIG. 3A  PARITY CODE CALCULATION
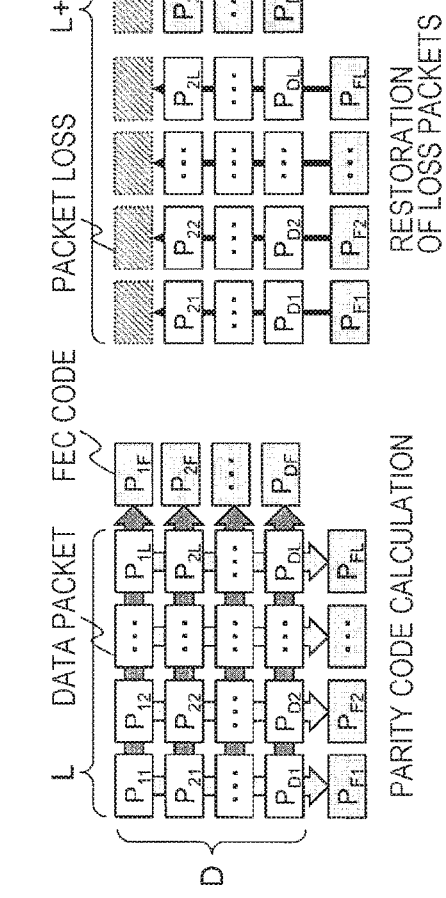
FIG. 3B  RESTORATION OF LOSS PACKETS
FIG. 3C  DATA AFTER RESTORATION
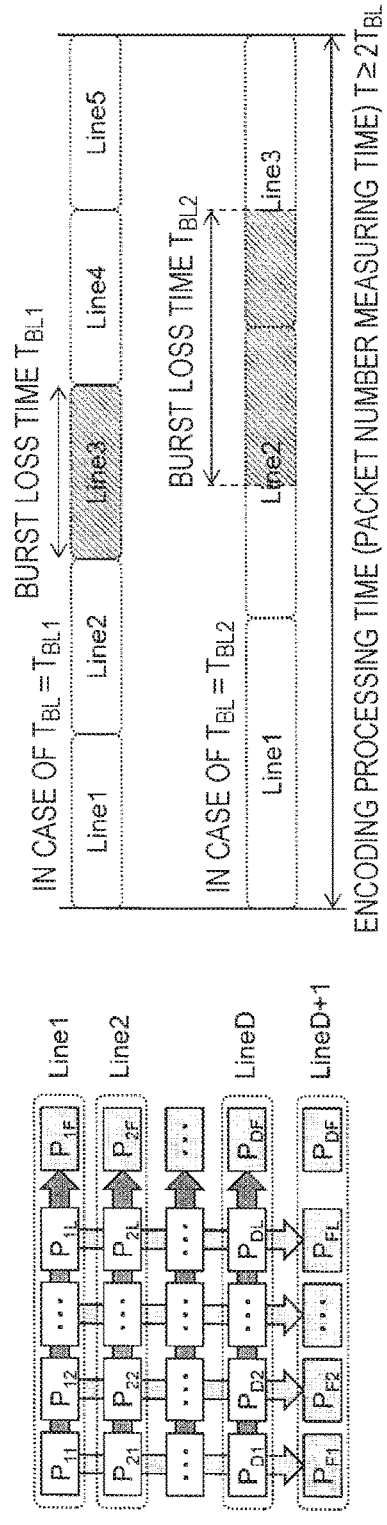
FIG. 3D  RELATION BETWEEN BURST LOSS AND ENCODED BLOCK SIZE

FIG. 5

| FEC HEADER | | | | | | | |
|---|---|---|---|---|---|---|---|
| HEADER IDENTIFIER | DATA FLAG | EXTENSION | ENCODING TIME | FEC ID | ENCODING PROCESSING AMOUNT | DATA POSITION | FEEDBACK DATA |

COMMUNICATION DEVICE, SYSTEM AND METHOD

TECHNICAL FIELD

The present invention relates to a communication device, system, and method, and particularly a communication device, system, and method for low-delay communication, applicable for various systems such as a remote monitoring system of a system for remote operation, a remote control system, and a remote monitoring control system.

BACKGROUND ART

Recently, there has been increasing demand for a remote monitoring control system that controls on-site devices as well as obtains videos and voice information in remote areas for plant production management and works under severe environments difficult for people to enter. In this case, it is possible to use, for example, a wide area network (WAN) such as the Internet that has been developed as a communication infrastructure for communications with remote areas.

Currently, as a major communication protocol that communicates via the WAN, a transmission control protocol (TCP) and a user datagram protocol (UDP) are used. In transmitting data from one terminal to another terminal, the TCP realizes highly reliable communications by guaranteeing an order in a data stream and retransmitting defective data. On the other hand, for applications requiring no highly reliable services, the UDP, a communication protocol with more emphasis on low-delay communications than reliability, is used. The UDP enables high-speed, low-delay transmission instead of retransmission or guarantee of the order in the data stream.

Meanwhile, as a protocol for distributing stream data such as videos and voices on a real-time basis, there is a real-time transport protocol (RTP). The RTP is a standardized system as a protocol for transmitting a real-time stream, and allows a time relation among data to be obtained on a receiving terminal side by adding time information to packet data to be transmitted. Video and voice data can be reproduced even when the data are partially defective. Therefore, lost or delayed packets are ignored on a receiving side and data can be reproduced using only packets delivered at a time expected on the receiving side. The RTP can be combined with both of the TCP and UDP, but the TCP guarantees the order in the data stream by retransmission. Therefore, in most cases, the RTP is used in combination with the UDP.

However, it is not possible to avoid a loss of a data packet caused in passing through a network only with the RTP. Particularly in an environment where a communication quality of a line is relatively poor, there is a problem that high-quality stream data may not be reproduced.

Thus, as a method for improving the reliability in data transmission, there has been proposed a system for imparting forward error correction (FEC) codes to data to be sent for transmission. Imparting the FEC codes for transmission can restore the loss of the data packet solely on the receiving side. Therefore, even when the communication quality of the line is relatively poor, low-delay, highly reliable communications can be realized. An FEC system in packet transmission calculates error correction codes in a plurality of packet units. As the FEC codes, parity codes, reed-solomon codes, and the like are used.

Generally in data transmission by internet protocol (IP) packets, data are packetized in a certain size based on a maximum transmission unit (MTU) of a communication environment for transmission. In a case where the FEC codes of the data packetized in a certain size are calculated, it is necessary to acquire a large number of original data packets included in an FEC encoded block in order to obtain sufficient burst loss resistance. However, when the number of packets to be input is small, a larger number of original data packets included in the FEC encoded block leads to an increase in delay in FEC calculation. Devised in PTL 1 is a system that enables calculation of the FEC codes without an increase in delay even at a low data rate by reconfiguring an FEC block by dividing a packet when a data amount of original data is small.

CITATION LIST

Patent Literature

PTL 1: JP 2008-160499 A

SUMMARY OF INVENTION

Technical Problem

As with PTL 1, in a system for changing a packet size in accordance with an amount of input data per unit time, there is a problem that a processing load after changes in packet size for each unit time is large. A plurality of packets is generated. Therefore, there is another problem that the load of a network increases.

The present invention has been made in view of the above, and an object thereof is to effectively suppress packet losses by setting an encoded block size, or an encoding processing time and encoded block size of error correction codes.

Solution to Problem

A first solution of the present invention provides a communication device including:

a line quality measuring section that calculates first line quality information including a first burst loss time based on packet defects of a received packet; an error correction decoding section that restores the defects of the received packet based on an encoding time T and an encoding processing amount, which is an encoded block parameter, included in an error correction header of the received packet; a feedback data acquiring section that acquires second line quality information including a second burst loss time $T_{SL}$ from the error correction header of the received packet; a packet number measuring section that variably or fixedly sets the encoding time T based on the second line quality information acquired from the feedback data acquiring section, and measures the number of packets N per encoding time T of a transmitted data packet; an error correction encoding section that derives the encoding processing amount based on the number of packets N measured by the packet number measuring section, the encoding time T set by the packet number measuring section, and the second line quality information acquired by the feedback data acquiring section, and generates an error correction encoded packet including error correction codes calculated based on the encoding processing amount; and a transmitted header processing section that generates a transmitted packet by imparting the error correction header including the encoding time T and encoding processing amount in the encoding processing by the error correction encoding section and the first line quality information calculated by the line quality measuring section to the transmitted data packet and the error correction encoded packet, respectively.

A second solution of the present invention provides a communication system including: a transmitting-side communication device having a transmitting unit and inserted between a terminal and a gateway on the transmitting side; and a receiving-side communication device having a receiving unit and inserted between a terminal and a gateway on the receiving side, wherein the receiving unit includes: a line quality measuring section that calculates first line quality information including a first burst loss time based on packet defects of a received packet; an error correction decoding section that restores the defects of the received packet based on an encoding time T and an encoding processing amount, which is an encoded block parameter, included in an error correction header of the received packet; and a feedback data acquiring section that acquires second line quality information including a second burst loss time $T_{SL}$ from the error correction header of the received packet, and the transmitting unit includes: a packet number measuring section that variably or fixedly sets the encoding time T based on the second line quality information acquired from the feedback data acquiring section, and measures the number of packets N per encoding time T of a transmitted data packet; an error correction encoding section that derives the encoding processing amount based on the number of packets N measured by the packet number measuring section, the encoding time T set by the packet number measuring section, and the second line quality information acquired by the feedback data acquiring section, and generates an error correction encoded packet including error correction codes calculated based on the encoding processing amount; and a transmitted header processing section that generates a transmitted packet by imparting the error correction header including the encoding time T and encoding processing amount in the encoding processing by the error correction encoding section and the first line quality information calculated by the line quality measuring section to the transmitted data packet and the error correction encoded packet, respectively.

A third solution of the present invention provides a communication method including the steps of: calculating first line quality information including a first burst loss time based on packet defects of a received packet; restoring the defects of the received packet based on an encoding time T and an encoding processing amount, which is an encoded block parameter, included in an error correction header of the received packet; acquiring second line quality information including a second burst loss time $T_{BL}$ from the error correction header of the received packet; setting variably or fixedly the encoding time T based on the acquired second line quality information, and measuring the number of packets N per encoding time T of a transmitted data packet; deriving the encoding processing amount based on the measured number of packets N, the encoding time T set by the packet number measuring section, and the acquired second line quality information, and generating an error correction encoded packet including error correction codes calculated by the encoding processing amount; and generating a transmitted packet by imparting the error correction header including the encoding time T and encoding processing amount in the encoding processing and the calculated first line quality information to the transmitted data packet and the error correction encoded packet, respectively.

Advantageous Effects of Invention

According to an embodiment of the present invention, packet losses can effectively be suppressed by setting an encoded block size or an encoding processing time and encoded block size of error correction codes.

BRIEF DESCRIPTION OF DRAWINGS

FIGS. 3A-3D are diagrams illustrating an exemplar encoding and decoding of error correction codes according to the first embodiment of the present invention.

FIG. 5 is a diagram illustrating an exemplary configuration of an FEC header according to the first embodiment of the present invention.

DESCRIPTION OF EMBODIMENTS (Summary)

A communication device according to the present embodiment is arranged on a transmitting side and a receiving side, respectively. The communication device is formed of a transmitting unit and a receiving unit, and included as a software or a hardware with FEC encoding and decoding functions. The transmitting unit includes a transmitted packet type determining section that determines communications from a specific communication partner or a specific application. The transmitted packet type determining section outputs a packet unchanged when determining that that FEC calculation is not necessary, and transmits data to a packet number measuring section when determining that the FEC calculation is necessary. The packet number measuring section measures the number of packets per unit time (encoding time). The transmitting unit also includes an FEC encoding section, a transmitted header processing section, and a packet transmitting section. The FEC encoding section calculates forward error correction codes based on the number of packets calculated for each of the encoding time by the packet number measuring section and feedback information of a burst loss time provided by the receiving unit. The transmitted header processing section imparts an FEC header to a packet processed by the FEC encoding section. The packet transmitting section transmits packets constituted by the transmitted header processing section.

The receiving unit includes a received packet type determining section that determines whether or not FEC decoding is necessary based on header information of packets to be brought in. The received packet type determining section outputs normal packets requiring no FEC decoding processing without processing, and transmits packets requiring the FEC decoding processing to a receiving buffer section. The receiving unit also includes an FEC decoding section, a line quality measuring section, a received header processing section, and a received packet output section. The FEC decoding section restores defects of packets from data of the receiving buffer. The line quality measuring section calculates the burst loss time based on defective packets of the receiving buffer and transmits the information to the transmitted header processing section of the transmitting unit. The received header processing section processes header information of the data decoded by the FEC decoding section. The received packet output section outputs packets after header processing.

The packet transmitting section of the transmitting unit can transmit packets at equal intervals for as long as it is required for encoding. The transmitting unit can also change a system for calculating FEC based on the burst loss time fed back and the encoding time for measuring the number of packets.

First Embodiment

Figure 1:
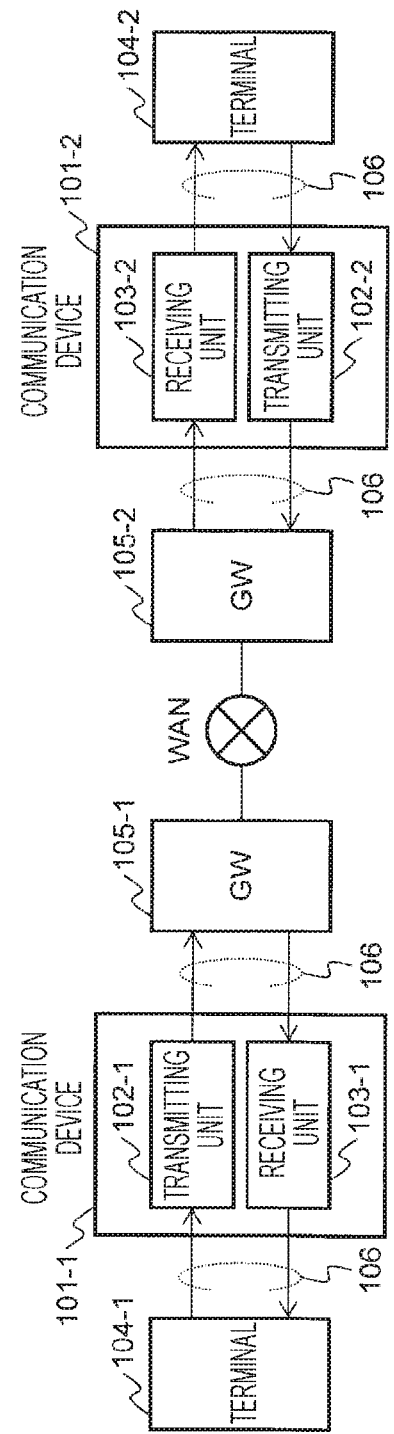
FIG. 1 is diagram illustrating a configuration of a communication system according to a first embodiment of the present invention.

FIG. 1 is diagram illustrating a configuration of a communication system according to a first embodiment of the present invention. A communication network via a WAN often sees a burst loss that several packets are continuously lost. A communication device according to the present embodiment is a good example to effectively suppress defects of packets due to the burst loss.

(Overall Configuration)

The embodiment illustrated in FIG. 1 denotes a configuration when terminals 104-1 and 104-2 perform an interactive communication. Communication devices 101 are connected between the terminals 104 and gateways (GWs) 105, and the devices are each connected via a communication line 106 such as Ethernet (registered trademark). The communication line 106 may be wired or wireless. Each communication device 101 includes a transmitting unit 102 and a receiving unit 103. For example, the communication device 101 may be a personal computer (PC). Each terminal 104 may be a device such as the PC, and the present system may be applied in order to control a plurality of devices connected to the PC.

When a data packet is transmitted from the terminal 104-1, a communication device 101-1 receives the data packet and inputs the data packet into a transmitting unit 102-1. The transmitting unit 102-1 executes encoding processing such as FEC calculation, and outputs the packet subjected to encoding processing toward a GW 105-1. The GW 105-1 that has received the data packet from the communication device 101-1 transmits the packet to a GW 105-2 via the WAN. The GW 105-2 that has received the data from a WAN side transfers the data packet to a communication device 101-2. The communication device 101-2 that has received the data from the GW 105-2 inputs the packet into a receiving unit 103-2. The receiving unit 103-2 decodes the encoded packet and transmits the data packet to the communication terminal 104-2 after error correction.

Similar processing is executed in a case where the terminal 104-2 transmits a packet to the terminal 104-1. Thus, the communication device 101 subjects a packet input from a local area network (LAN) side to packet encoding processing at the transmitting unit 102, and a packet received from the WAN side to decoding processing by the receiving unit 103. With the present configuration, it is only necessary that the communication device 101 be inserted as a bridge in a route where the normal terminal 104 and the GW 105 are directly connected, and it is possible to subject the data packet to FEC calculation processing without changing an existing communication system. It is also possible to connect a network router or a hub between the GW 105 and the communication device 101, or between the communication device 101 and the terminal 104.

(Communication Device 101)

Figure 2:
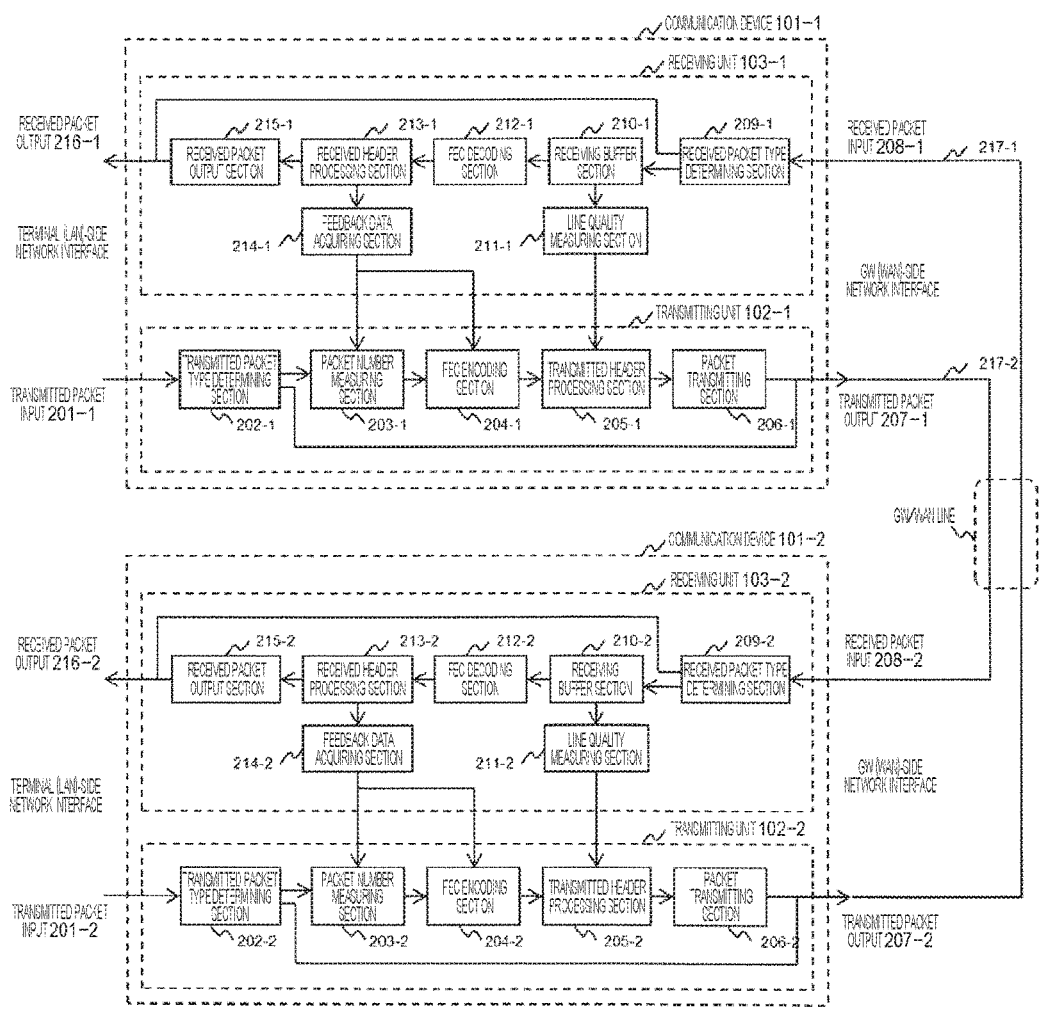
FIG. 2 is a diagram illustrating an exemplary configuration of the communication device according to the first embodiment of the present invention.

FIG. 2 illustrates a configuration diagram of the communication devices 101. The communication device 101-1 is paired with the communication device 101-2, and each communication device 101 includes the transmitting unit 102 and the receiving unit 103. A transmitted packet input 201-1 input from a terminal side (LAN side) is incorporated into the transmitting unit 102-1 and sent to a transmitted packet type determining section 202-1. The transmitted packet type determining section 202-1 has a function of determining whether the packet is sent from a specific communication partner set in advance or from a specific application, transmitting an appropriate packet to a packet number measuring section 203-1, and outputting a non-appropriate packet unchanged as a transmitted packet output 207-1. The transmitted packet type determining section 202-1 compares header information such as an IP address, a port number, and a communication protocol described in a header of the transmitted packet input 201-1 with the information set in advance, and determines whether or not the packet is appropriate. The IP address, port number, and communication protocol, which are determining conditions by the transmitted packet type determining section 202-1, can be set in a plurality of combinations in advance.

For example, in a case where it is determined whether or not a packet is to be subjected to FEC calculation in accordance with settings of an IP address and a port number, a communication protocol can become an object of the FEC calculation regardless of the type such as the TCP, UDP, and RTP.

The packet number measuring section 203-1 measures the number of packets to be transmitted from the transmitted packet type determining section 202-1, and outputs information on the number of packets calculated for each encoding processing time T to an FEC encoding section 204-1. Thus, the encoding processing time T for measuring the number of packets appears as a delay in encoding processing. In order to select an optimal encoding processing time T in accordance with a line condition of a network, the packet number measuring section 203-1 can change and set dynamically and adaptively an encoding time T based on information (for example, line quality information) from a feedback data acquiring section 214-1. As with an embodiment to be described later, the encoding time T may be set fixedly in advance. Details of setting the encoding time T at the packet number measuring section 203-1 will be described later. The packets input into the packet number measuring section 203-1 may be sequentially transferred to the FEC encoding section 204-1, or the input packets may be temporarily stored in a buffer in the packet number measuring section 203-1 and transferred to the FEC encoding section 204-1 simultaneously with a completion of measuring the number of packets.

The FEC encoding section 204-1 subjects the data packet input from the packet number measuring section 203-1 to FEC encoding with sufficient resistance to the burst loss based on the number of packets measured by the packet number measuring section 203-1, the encoding time T dynamically or adaptively set or fixedly set in advance by the packet number measuring section 203-1, and line quality information acquired by the feedback data acquiring section 214-1 of the receiving unit 103-1. However, in cases where the feedback data acquiring section 214-1 has no line quality information, where the line quality information is old, or the like, the FEC encoding can be carried out based on a value set in advance. Details of the encoding processing at the FEC encoding section 204-1 will be described later.

The data packet input into the FEC encoding section 204-1 and an FEC encoded packet calculated therein are transmitted to an transmitted header processing section 205-1. The transmitted header processing section 205-1 imparts an FEC header with details of the FEC encoding described to each packet and transmits to a packet transmitting section 206-1. At this time, the transmitted header processing section 205-1 houses, in the FEC header, the line quality information of a communication route 217-1, measured by a line quality measuring section 211-1 of the receiving unit 103-1 as feedback information to the communication unit 101-2. The packet transmitting section 206-1, which has received data from the transmitted header processing section 205-1, transmits the data toward the WAN side as the transmitted packet output 207-1 by adjusting a packet transmitting time such that packet data in the buffer are transmitted at equal intervals for as long as it is required for the encoding time T.

On the other hand, after receiving a received packet input 208-2 from the GW side (WAN side), the communication device 101-2 transmits the packet to a received packet type determining section 209-2. The received packet type determining section 209-2 reads information such as an IP header, TCP, UDP header, FEC header, and other header information of the received packet input 208-2, and determines whether or not FEC decoding processing is required. Required conditions for this determination such as appropriate combinations can be set in advance. As for a packet determined to require no FEC decoding processing, the received packet is output as a received packet output 216-2, and a packet determined to require the decoding processing is transmitted to a receiving buffer section 210-2 based on the information on the FEC header. The receiving buffer section 210-2 houses the data sent from the received packet type determining section 209-2. In a case where it is determined that a packet loss is caused in the receiving buffer section 210-2, or whether or not a packet loss is caused, a line quality measuring section 211-2 measures the line quality information of a communication line 217-2 based on packet loss occurrence, and transmits to an transmitted header processing section 205-2 of a transmitting unit 102-2. Line quality information means, for example, an average packet loss rate, maximum burst loss time, or burst loss time. The received packet housed in the receiving buffer section 210-2 is transmitted to an FEC decoding section 212-2 and subjected to error correction processing of the packet loss. The packet data subjected to the error correction are sent to a received header processing section 213-2 and output from a received packet output 215-2 as the received packet output 216-2 after information such as the FEC header is removed. A feedback data acquiring section 214-2 acquires and transmits the line quality information of a communication line 217-1 included in the FEC header of the received packet to a packet number measuring section 203-2 and an FEC encoding section 204-2 of the transmitting unit 102-2. Communication from the communication device 101-2 to the communication device 101-1 is performed in a similar manner.

As error correction codes, in the present embodiment, a case where FEC codes are used will be described as an example, but the error correction codes are not limited to this. Parity and other appropriate error correction codes may be used.

(FEC Encoding Section 204)

The FEC encoding section 204 constitutes an FEC encoded block from the data packet and generates the FEC encoded packet for each encoded block.

FIGS. 3(a) to 3(d) illustrate an example using a two-dimensional parity encoding system as an FEC encoding system, for example. In FIG. 3(a), by constituting an FEC encoded block of D lines×L columns from a data packet and calculating an exclusive logical sum (XOR) for each line and column of the encoded block, an FEC encoded packet is generated each in vertical and horizontal directions. The data packet and the FEC encoded packet are transmitted via the WAN. For example, the packets are transmitted for each line in an order of $P_{11}$, $P_{12}$, ... $P_{1L}$, $P_{1F}$, $P_{21}$, ... $P_{2L}$, $P_{2F}$, ... $P_{F1}$, $P_{F2}$, ... and $P_{FL}$. At this time, as illustrated in FIG. 3(b), it is assumed that L+1 sequential packet losses (burst losses) are caused. Even if a packet is lost in a middle of a transmission route, recalculation of XOR of each line and column of the received FEC encoded block can, as illustrated in FIG. 3(c), restore the lost packet through calculation solely on the receiving side. Thus, with two-dimensional parity codes, as long as there is one loss for each line and column, original data can be restored from the parity codes. Therefore, sequential losses of up to L+3 packets can be restored by the parity. Here for simplification, it is set that the burst loss resistance is equivalent to one line (L+1) of the FEC encoded blocks. Then, in a case where the number of packets equivalent to one line of the FEC encoded block is greater than the number of burst losses caused in the line, the lost packet can be restored. Here, the burst loss is mainly attributable to, for example, a buffer overflow in a switching network, and the number of burst losses changes in proportion to a data transmission rate. Thus, it is necessary to determine a burst loss by the time during which a packet loss is caused and not by the number of packet losses. That is, it is only necessary in the FEC encoded block that a time for transmitting one line is longer than a burst loss time $T_{BL}$. A method for calculating the burst loss time $T_{BL}$ will be described in detail in a description of a line quality measuring section 211.

Assuming that the FEC encoding section 204 can obtain the burst loss time $T_{BL}$ measured by the line quality measuring section 211 via a feedback data acquiring section 214, it is possible to generate an FEC matrix (FEC encoded block) with a high burst loss resistance by transmitting one line (L+1) of data for a period equal to or longer than $T_{BL}$. Here, assuming that N packets are measured by a packet number measuring section 203 during the encoding time T,

[Mathematical Formula 1]

$$D + 1 \leq \frac{T}{T_{BL}} \quad \text{(Formula 1)}$$

$$L = \frac{N}{D} \quad \text{(Formula 2)}$$

and a size of the FEC encoded block can be determined.

FIG. 3(d) illustrates an example of changes in D and L of the encoded block with $T_{BL}$. A left-hand side in FIG. 3(d) illustrates a definition of each line in the encoded block. A right-hand side in FIG. 3(d) indicates how the data are transmitted in order from Line 1, and illustrates a difference between cases where the burst loss time $T_{BL}$ is short ($T_{BL}=T_{BL1}$) and long ($T_{BL}=T_{BL2}$). In a case where $T_{BL}$ is short, more lines D and less columns L than a case where $T_{BL}$ is long are transmitted. On the other hand, in a case where $T_{BL}$ is long, less lines D and more columns L than a case where $T_{BL}$ is short can be transmitted. When the burst loss time $T_{BL}$ is comparable to a transmitting time of one line of data, the data can be restored on the receiving side.

In calculation of the two-dimensional parity codes, even if the data packet of the FEC encoded block is one line (D=1), two lines of packets are generated when the parity codes are included. Therefore, in a case where the packets are transmitted for the time $T_{BL}$ per line, at least a time $2T_{BL}$ is necessary to transmit all packets in the buffer. Therefore, a packet number measuring time T is set to be a time equal to or more than $2T_{BL}$.

(Packet Number Measuring Section 203)

The packet number measuring section 203 acquires the line quality information such as the burst loss time $T_{BL}$ of the communication line as feedback data from the feedback data acquiring section 214, and can change an FEC encoding time T so as to shorten a delay in FEC calculation while obtaining sufficient burst loss resistance. The packet number measuring section 203 may change the encoding processing time T so as to set the encoding time T to be at least twice or more of $T_{BL}$.

The packet number measuring section 203 presets, for example, n at 2 in order to keep the delay as low as possible, or to be an integer equal to or greater than 3, acquires information of the burst loss time $T_{BL}$ from the feedback data acquiring section 214, and can change the encoding time T of the packet number measuring section 203 for each time set in advance so as to be $$T = n \times T_{BL} \tag{Formula 3}$$

(however, n is an integer equal to or greater than 2, and a value arbitrarily set). A timing for dynamically setting T may be set, for example, for each packet with a new FECID with reference to the FEC header to be described later, or may be set for each appropriate time determined in advance.

(Transmitted Header Processing Section 205)

The data packets that have constituted the encoded block in the FEC encoding section 204, and the FEC encoded packets generated therein are sent to the transmitted header processing section 205.

Figure 4:
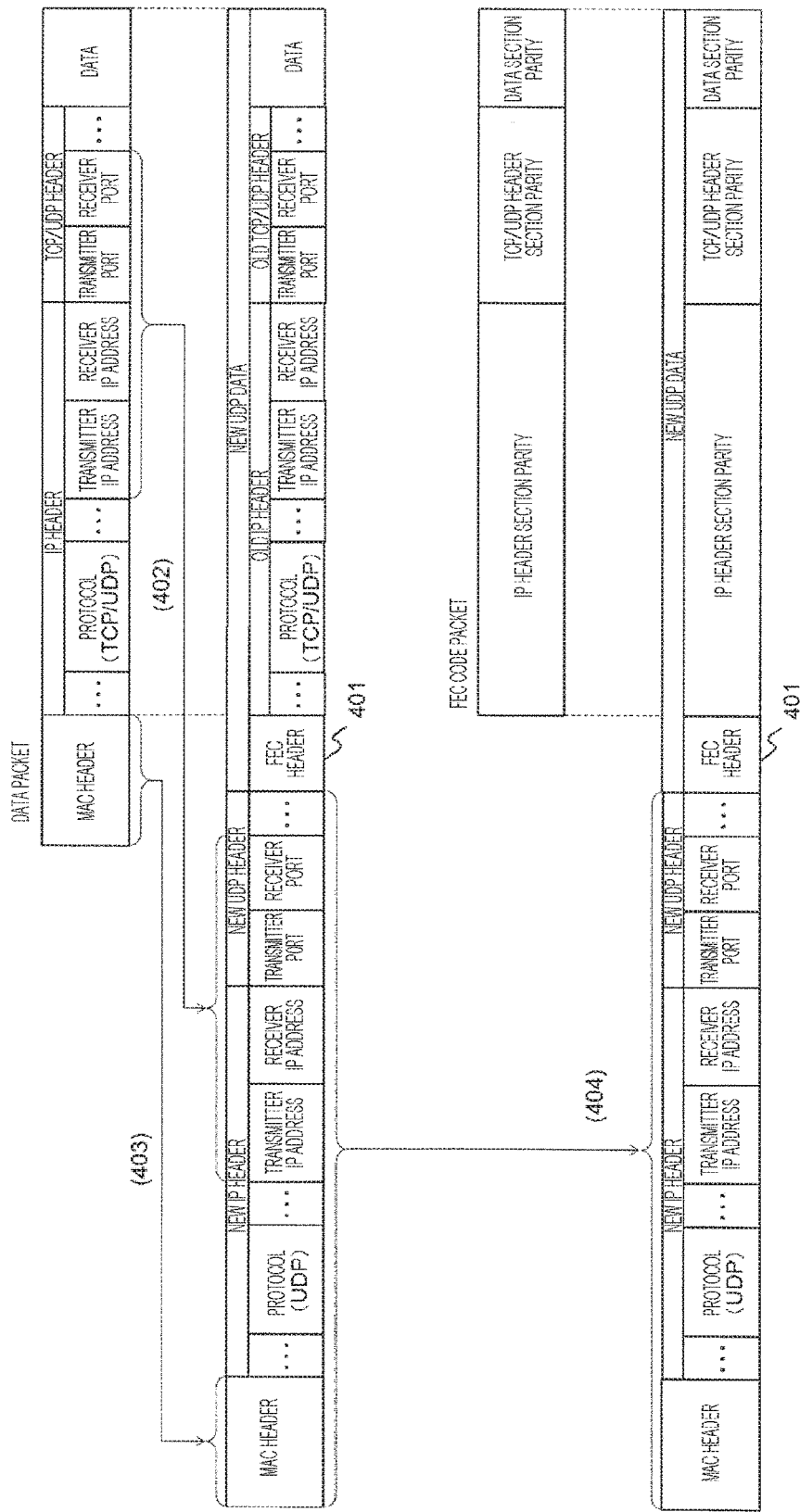
FIG. 4 is a diagram illustrating an exemplary header processing on a transmitting side according to the first embodiment of the present invention.

FIG. 4 illustrates an embodiment of header processing in the transmitted header processing section 205. First, as for data packets, a data packet to be received by the transmitted header processing section 205 can include a plurality of protocols. Therefore, the transmitted header processing section 205 newly packs the arrived data packet in an UDP/IP header and encapsulates the old data packet as a data section of the new UDP packet. In this situation, a protocol section of the new IP header serves as the UDP, and source and destination IP addresses in the IP header and source and destination ports in the UDP header are generated by copying information of the old data packet (402). In a case where the communication device 101 operates as a bridge, information of a MAC header is also copied (403). In addition, the FEC header with details of the FEC encoding described is imparted to a head of the new UDP data section.

On the other hand, as for the FEC encoded packet generated in the FEC encoding section 204, the header information described in the last data packet is copied and used without any changes (404). As for a packet fragmented in the IP header, the header information similar to that in a first half of the fragmented packet is copied to a second half thereof.

(FEC Header 401)

FIG. 5 illustrates an exemplary configuration of an FEC header 401. This illustrates an example of a minimum configuration, and may include other information as the FEC header. In FIG. 5, a header identifier is used for recognizing the FEC header. A data flag is used for identifying whether data following the FEC header are data packets or FEC encoded packets. Extension indicates presence or absence of the feedback data. The encoding time indicates a packet measuring time of the packet number measuring section 203, and is equivalent to the time T described above. In the encoding time of the FEC header 401, time information may be directly described, or a method for describing codes corresponding to a plurality of predetermined times is also acceptable. An FECID is a value to be incremented for each encoding time T in the FEC encoding section 204, and indicates at which time or in which FEC encoded block the packet has been processed. An encoding processing amount indicates a parameter when an encoded block is generated. For example, in case of the two-dimensional parity codes, information on D and L is described. A data position is information indicating where the packet is in the encoded block, and can also be used for correcting the order of a reverse packet, for example. The feedback data are used for sending back the line quality information such as the burst loss time and packet error rates measured in the receiving unit, and/or other information.

(Receiving Buffer Section 210)

A receiving buffer section 210 secures a storage area for receiving a packet when a new FECID is received, and continues to receive only for a time $T+T_j$ derived by adding a jitter compensation time $T_j$ to the encoding time T described in the FEC header. Here, $T_j$ is a value set in advance. The receiving buffer section 210 transmits a signal to start processing to the line quality measuring section 211 and an FEC decoding section 212, when all packets in the FEC encoded block are received, or when the time $T+T_j$ has passed after receiving a new FECID packet and a time-out occurs.

(Line Quality Measuring Section 211)

When receiving the signal to start processing from the receiving buffer section 210, the line quality measuring section 211 starts processing. A packet transmitting section 206 sends out packets generated in the FEC encoded block during the encoding time T at equal intervals. Therefore, the line quality measuring section 211 of the communication device 101 on the receiving side can measure the number of lost packets of the encoded packets and the number of burst losses with reference to the information acquired from the receiving buffer 210 and the FEC header of the received packet, and calculate information on the line condition (line quality information) such as a maximum burst loss time or burst loss time, and an average packet error rate.

In a case where the burst loss time is used as the line quality information, it is possible to calculate as described below. For example, assuming that M packets including the FEC encoded packets have been transmitted during the encoding time T, the line quality measuring section 211 can acquire information of T and M from the FEC header received normally, and calculate that a transmission time interval of the packets is T/M. Therefore, in a case where up to k received packets are sequentially lost, the burst loss time $T_{BL}$ can be calculated by the following formula.

[Mathematical Formula 2]

$$T_{BL} = k\frac{T}{M} \quad \text{(Formula 4)}$$

The line quality measuring section 211 can derive a maximum value of $T_{BL}$ at a predetermined time as the maximum burst loss time, which may be used as the line quality information. The calculated line quality information is transmitted to the transmitted header processing section 205. The line quality information transmitted to the transmitted header processing section 205 is housed in a transmitted header as the feedback data to the communication device on a partner terminal side.

(Feedback Data Acquiring Section 214)

The line quality information measured in the line quality measuring section 211 is housed in the transmitted header as the feedback data. The feedback data acquiring section 214 can execute appropriate encoding and decoding processing even in a case where line quality is different between incoming and outgoing lines by retrieving the feedback data including the line quality information such as the burst loss time and the average packet loss rate from the FEC header received from the communication device on the partner side.

(FEC Decoding Section 212)

The FEC decoding section 212 restores the packet loss caused in the received packet based on the information such as the encoding time T, encoding processing amount (D, L), and data position described in the FEC header.

Once receiving the signal to start processing from the receiving buffer section 210, the FEC decoding section 212 starts processing for decoding and restoring the packet loss.

(Received Header Processing Section 213)

A received header processing section 213 discards an FEC encoded packet and subjects a data packet to header processing based on a data flag of the FEC header.

Figure 6:
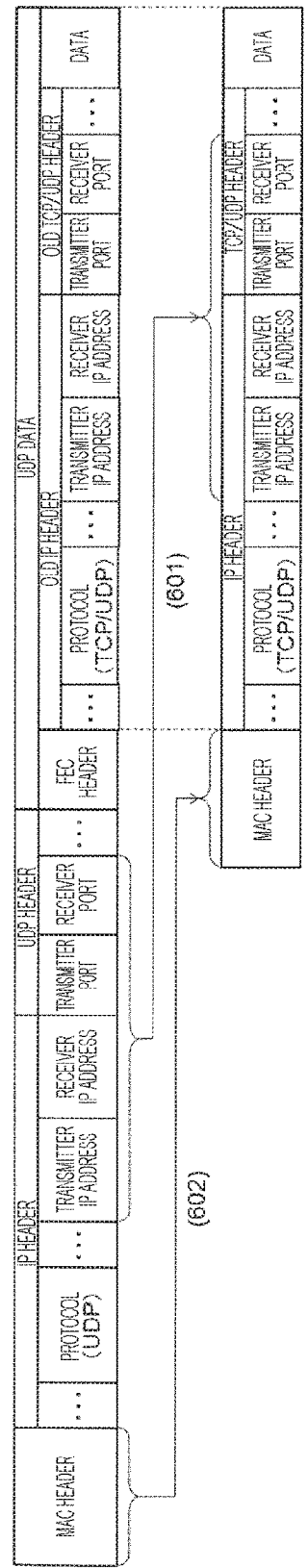
FIG. 6 is a diagram illustrating an exemplary header processing on a receiving side according to the first embodiment of the present invention.

FIG. 6 illustrates an embodiment of header processing at the received header processing section 213. The received packet has a structure where an original data packet is encapsulated in the UDP/IP header. Therefore, the received header processing section 213 retrieves the old data packet section from the data section of the UDP packet. In a case where network address translation (NAT) is carried out at the GW on the transmitting side or the receiving side, the source and destination IP addresses and source port number of the received packet are translated. Therefore, the received header processing section 213 overwrites the information in the retrieved old data packet section (601). The received header processing section 213 also generates copies of the MAC header (602). This enables packet transmission corresponding to IP masquerade and port forwarding as well. After the above header operation, the received header processing section 213 transmits the data packet to a received packet output section 215. In a case where the feedback data have been described in the FEC header 401, the information is transmitted to the feedback data acquiring section 214.

Second Embodiment

In the FEC encoding section 204 of the transmitting unit 102 indicated in the first embodiment, it is assumed that the feedback data including the line quality information such as the burst loss time $T_{BL}$ and an average loss rate have been acquired from the feedback data acquiring section 214. In a case where the average loss rate is higher than a predetermined threshold despite the encoding time T set at a value more than twice the burst loss time $T_{BL}$, it is thought, for example, that the loss rate is increasing due to a random error rather than a burst error. In this case, the FEC encoding section 204 may improve the loss rate by arbitrarily decrease a value of D derived by calculation. For example, in a case where the average loss rate is higher than the threshold, the FEC encoding section 204 may decrease the value of D calculated by Formula 1 only by 1 and then calculate L by Formula 2. The FEC encoding section 204 determines the loss rate and the threshold again after a certain time $T_{C1}$ has passed. In a case where the loss rate exceeds the threshold, the above procedure is repeated, and in a case where the loss rate falls below the threshold, the value of D can be maintained unchanged until a certain time $T_{C2}$ passes. After the time $T_{C2}$ has passed, it is possible to return to a system for calculating D and L by Formulae 1 and 2.

Third Embodiment

Figure 7:
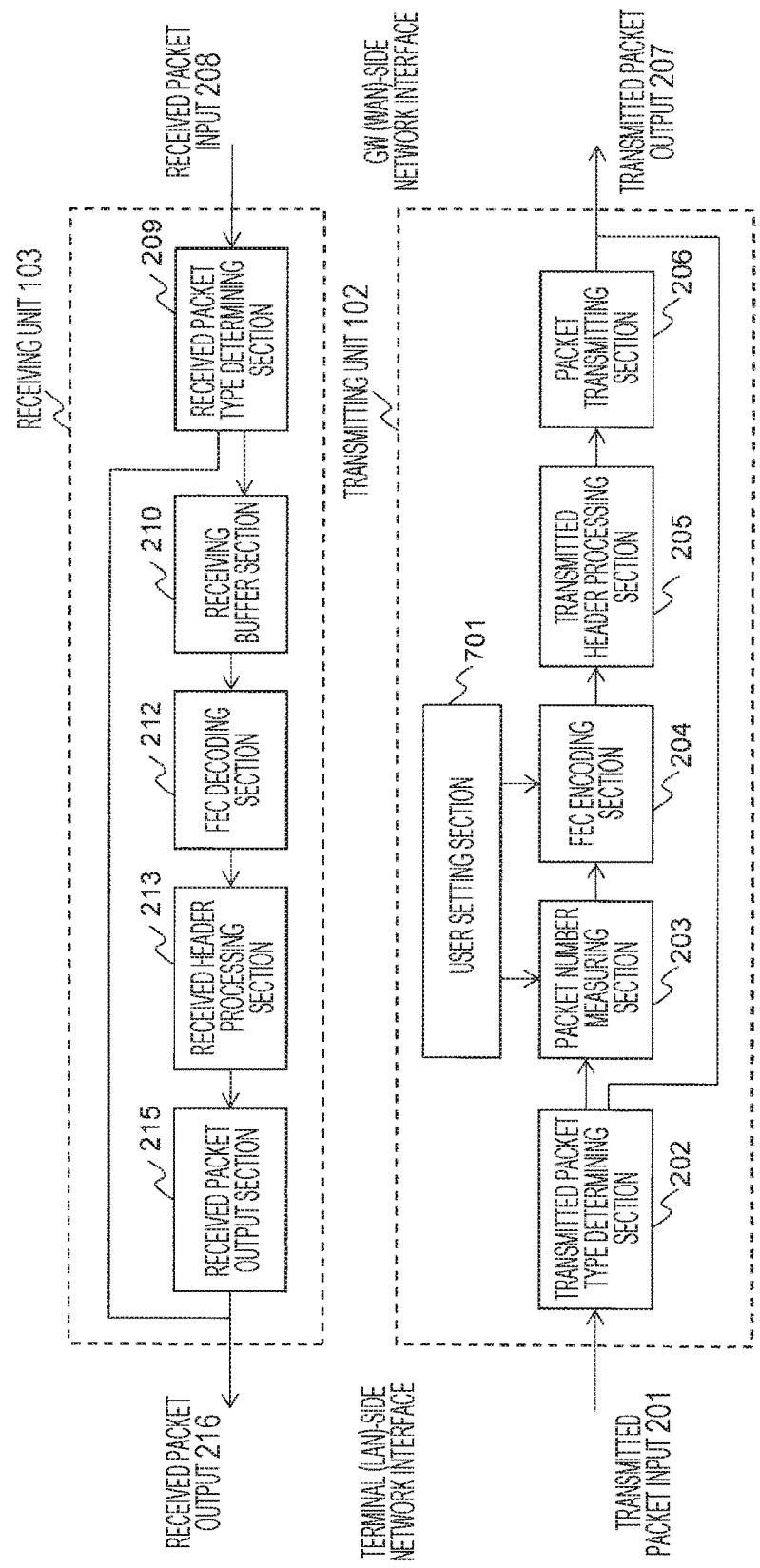
FIG. 7 is a diagram illustrating an exemplary configuration of a communication system according to a second embodiment of the present invention.

FIG. 7 is a diagram illustrating a configuration of the communication system according to the second embodiment of the present invention. According to the present embodiment, a transmitting unit 102 and a receiving unit 103 can operate independently. It is not always necessary that the transmitting unit 102 and the receiving unit 103 exist in the same device. Therefore, a transmitter can mount only the transmitting unit 102, and a receiver can mount only the receiving unit 103, which makes it possible to subject a one-way communication to FEC encoding processing. In a user setting section 701 of the transmitting unit 102, values such as an encoding time T and a burst loss time $T_{BL}$ are set in advance, and a packet number measuring section 203 and an FEC encoding section 204 execute the FEC encoding processing based on this information of T and $T_{BL}$. Parameters such as T and $T_{BL}$ described in the user setting section 701 can be changed arbitrarily by a user.

Fourth Embodiment

In a system described in FIG. 7, it is possible to preset an encoding time T, burst loss time $T_{BL}$, and sizes of D and L in accordance with the number of input packets N per encoding time T in the user setting section 701. A value of n in Formula 3 may be preset instead of T. T may be set to be twice or n times equal to or greater than 3 predetermined based on a measured value of a statistical $T_{BL}$. By describing in advance appropriate D and L in accordance with N in the user setting section 701, appropriate FEC encoded blocks can be generated each time without calculation of Formulae 1 and 2 in the first embodiment.

Fifth Embodiment

In each of the communication devices 101 illustrated in FIG. 1, fragmentation of packets by an IP header can be avoided by presetting an MTU size of a communication port on a side to be connected to a terminal 104 to be smaller than the MTU size of the communication port on a side to be connected to a GW 105 by a header length to be imparted by a header processing section 205.

Sixth Embodiment

Figure 8:
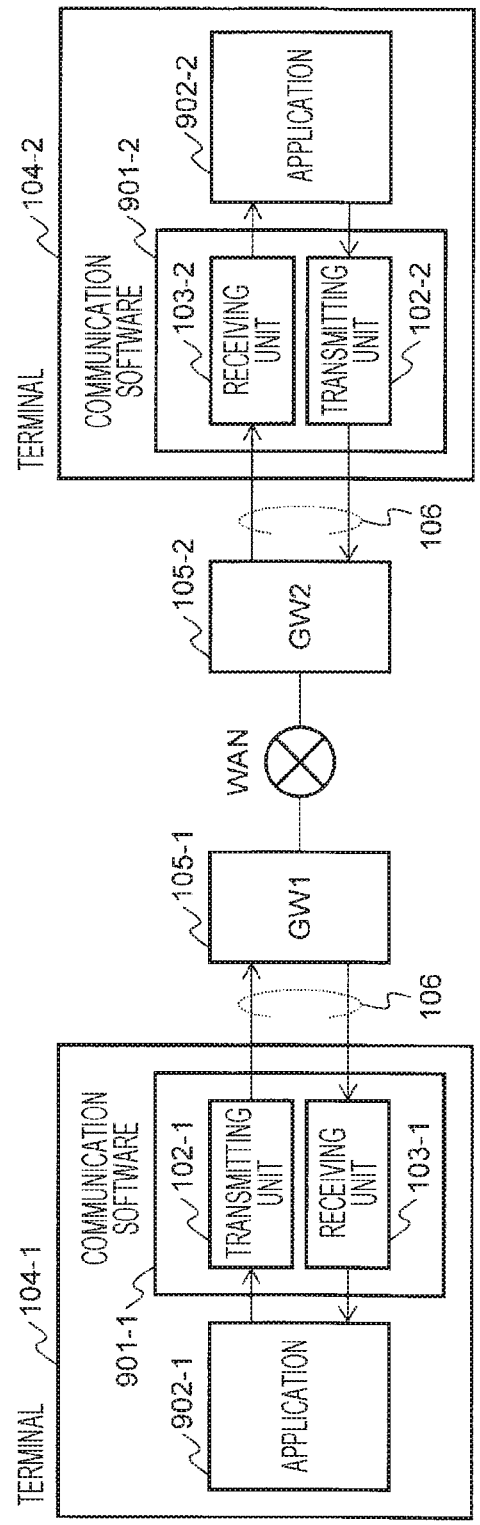
FIG. 8 is a diagram illustrating a configuration of a communication system according to a third embodiment of the present invention.

FIG. 8 is a diagram illustrating a configuration of the communication system according to the third embodiment of the present invention. The embodiment illustrated in FIG. 8 is an embodiment where the communication device 101 according to the first embodiment is mounted as a communication software 901 of a communication terminal 104. The communication software 901 includes a transmitting unit 102 and a receiving unit 103, calculates FEC codes for a communication from a specific application 902, and transmits an encoded packet to a GW 105. For example, the terminal 104 may be a mobile phone terminal or a mobile information terminal, and the GW 105 may be a mobile phone base station or worldwide interoperability for microwave access (WiMAX).

(Advantageous Effects of Embodiments)

According to embodiments of the present invention, even in a case where the number of packets per unit time is small, a packet loss attributable to a burst loss can be effectively suppressed without fragmentation of a data packet by adaptively changing a size of an FEC encoded block and uniformly transmitting packets at equal intervals during the unit time.

According to the present embodiment, equal intervals of packet transmission in a transmitting unit and FEC calculation to a burst loss time can effectively prevent the burst loss while suppressing an increase in FEC processing loads such as packet fragmentation and excessive transmission of redundant packets. It is also possible to impart FEC to a specific application and choose not to impart FEC to other applications.

(Supplementary Note)

The present invention is not limited to the above embodiments, and includes various types of modifications. For example, the above embodiments are described in detail in order to describe clearly the present invention, and are not necessarily limited to those including all configurations that have been described. It is possible to replace a part of a configuration in an embodiment by configurations in other embodiments, and it is also possible to add to a configuration of an embodiment configurations in other embodiments. For a part of a configuration in each embodiment, additions, deletions, or substitutions of other configurations can be made.

Each of the above configurations, functions, processing sections, processing means, and the like may be realized through hardware, for example, by designing a part or all of them with an integrated circuit. Each of the above configurations, functions, and the like may be realized through software by interpretation and execution of programs for realizing respective functions by a processor. Information such as programs, tables, and files for realizing each function can be stored in a recording unit such as a memory, hard disc, and solid state drive (SSD), or a recording medium such as an IC card, SD card, and DVD.

Presented are control lines and information lines considered necessary for description, and not all control lines and information lines are presented in view of products. Practically, it may be considered that nearly all configurations are connected to one another.

A communication method or communication device/system according to an embodiment of the present invention can be provided by a communication program for causing a computer to execute each of the procedures, a computer-readable recording medium with the communication program recorded, a program product including the communication program, capable of being loaded into an internal memory of the computer, a computer such as a server including the program, and the like.

REFERENCE SIGNS LIST

101 communication device
102 transmitting unit
103 receiving unit
104 terminal
105 GW (gate way)
106 communication line (wired, wireless)
201 packet input into transmitting unit 102
202 transmitted packet type determining section
203 packet number measuring section
204 FEC encoding section
205 transmitted header processing section
206 packet transmitting section
207 packet output from transmitting unit 102
208 packet input into receiving unit 103
209 received packet type determining section
210 receiving buffer section
211 communication quality measuring section
212 FEC decoding section
213 received header processing section
214 feedback data acquiring section
215 received packet output section
216 packet output from receiving unit 103
401 FEC header
701 user setting section
801 transmission route of feedback information
901 embodiment with communication device 101 mounted as software
902 user application

The invention claimed is:

1. A communication device comprising:
a line quality measuring section that calculates first line quality information including a first burst loss time based on packet defects of a received packet;
an error correction decoding section that restores the defects of the received packet based on an encoding time T and an encoding processing amount, which is an encoded block parameter, included in an error correction header of the received packet;
a feedback data acquiring section that acquires second line quality information including a second burst loss time $T_{BL}$ from the error correction header of the received packet;
a packet number measuring section that variably or fixedly sets the encoding time T based on the second line quality information acquired from the feedback data acquiring section, and measures the number of packets N per encoding time T of a transmitted data packet;
an error correction encoding section that derives the encoding processing amount based on the number of packets N measured by the packet number measuring section, the encoding time T set by the packet number measuring section, and the second line quality information acquired by the feedback data acquiring section, and generates an error correction encoded packet including error correction codes calculated based on the encoding processing amount;
a transmitted header processing section that generates a transmitted packet by imparting the error correction header including the encoding time T and encoding processing amount in the encoding processing by the error correction encoding section and the first line quality information calculated by the line quality measuring section to the transmitted data packet and the error correction encoded packet, respectively; and
a packet transmitting section that transmits the transmitted packet generated by the transmitted header processing section, wherein
the packet transmitting section transmits the transmitted packet subjected to the error correction encoding processing such that packet transmitting intervals are equal for each of the encoding time T.

2. The communication device according to claim 1,
wherein the error correction encoding section executes encoding processing based on:
the second burst loss time $T_{BL}$ acquired as the second line quality information by the feedback data acquiring section;
the number of packets N measured by the packet number measuring section; and
the encoding time T set in advance.

3. The communication device according to claim 2,
wherein the error correction codes are forward error correction (FEC) codes, and
the error correction encoding section uses processing for calculating FEC codes of a two-dimensional parity as error correction encoding processing and determines, when it is assumed that a line size of an error correction encoded block is D and a column size thereof is L as the encoding processing amount, an encoding time is T, the number of packets input within the encoding time T is N, and a burst loss time of a communication line is $T_{BL}$, the line size D and the column size L, which are the encoding processing amount, so as to meet the following formula.

[Mathematical Formula 1]

$$D + 1 \leq \frac{T}{T_{BL}} \quad \text{(Formula 1)}$$

$$L = \frac{N}{D}. \quad \text{(Formula 2)}$$

4. The communication device according to claim 3, wherein the error correction encoding section compares an average loss rate acquired as the second line quality information by the feedback data acquiring section and a threshold of a preset loss rate, and calculates the encoding processing amount by decreasing the line size D derived by the Formula 1 by 1 in a case where the average loss rate exceeds the threshold.

5. The communication device according to claim 4, wherein the error correction encoding section updates the column size L by the Formula 2 and calculates the encoding processing amount in a case where the line D derived by the Formula 1 is decreased by 1.

6. The communication device according to claim 1, wherein the packet number measuring section acquires the second burst loss time $T_{BL}$ as the line quality information from the feedback data acquiring section and changes the encoding time T so as to be $T=n\times T_{BL}$ (Formula 3) (however, n is 2, or an integer equal to or greater than 3 and an arbitrarily set value) for each time when a received packet with a new value of an error correction ID to be set for each encoding time T is received, or for each of other preset times.

7. The communication device according to claim 1 further comprising a setting section that presets the encoding time T of the packet number measuring section and the second burst loss time $T_{BL}$ at fixed values,
wherein the transmitting unit including the packet number measuring section, the error correction encoding section, the transmitted header processing section, and the setting section, and the receiving unit including the line quality measuring section, the error correction decoding section, and the feedback data acquiring section execute processing independently.

8. The communication device according to claim 1 further comprising a receiving buffer section that receives received packets for a time $T+T_j$ derived by adding a jitter compensation time $T_j$ to the encoding time T described in the error correction header, when the received packet with the new value of the error correction ID to be set for each encoding time T is received,
wherein the error correction decoding section has a function of restoring and decoding a packet defect caused in the received packet after the time $T+T_j$.

9. The communication device according to claim 1, wherein the packet number measuring section sets the encoding time T to be twice or a predetermined integer n times equal to or greater than 3 a maximum or average value of the second burst loss time $T_{BL}$ measured in advance.

10. The communication device according to claim 1 further comprising:
a transmitted packet type determining section that sorts out the transmitted packets in order to output predetermined specific transmitted packets from a transmitting-side terminal to the packet number measuring section for error correction encoding and output other transmitted packets without changes; and
a received packet type determining section that sorts out received packets in order to subject those which have been subjected to the error correction encoding to error correction decoding when received, and output other received packets without changes when received.

11. The communication device according to claim 1,
wherein on a transmitting side, the transmitted header processing section packs a transmitted data packet in a UDP header and transmits as a UDP packet, and
on a receiving side, a received header processing section for extracting a received data packet from a UDP packet that has received the UDP packet is further included.

12. The communication device according to claim 11, wherein the transmitted header processing section generates a UDP header by coping source and destination addresses and source and destination ports in the header of a data packet to be transmitted.

13. The communication device according to claim 11, wherein the received header processing section generates a received packet by copying, to a received data packet extracted from a UDP packet decoded by the error correction decoding section, the source and destination addresses and source and destination ports from the header information of the UDP packet.

14. A communication system comprising:
a transmitting-side communication device having a transmitting unit and inserted between a terminal and a gateway on the transmitting side; and
a receiving-side communication device having a receiving unit and inserted between a terminal and a gateway on the receiving side,
wherein the receiving unit comprises:
a line quality measuring section that calculates first line quality information including a first burst loss time based on packet defects of a received packet;
an error correction decoding section that restores the defects of the received packet based on an encoding time T and an encoding processing amount, which is an encoded block parameter, included in an error correction header of the received packet; and a feedback data acquiring section that acquires second line quality information including a second burst loss time $T_{BL}$ from the error correction header of the received packet, and the transmitting unit comprises:

a packet number measuring section that variably or fixedly sets the encoding time T based on the second line quality information acquired from the feedback data acquiring section, and measures the number of packets N per encoding time T of a transmitted data packet;

an error correction encoding section that derives the encoding processing amount based on the number of packets N measured by the packet number measuring section, the encoding time T set by the packet number measuring section, and the second line quality information acquired by the feedback data acquiring section, and generates an error correction encoded packet including error correction codes calculated based on the encoding processing amount;

a transmitted header processing section that generates a transmitted packet by imparting the error correction header including the encoding time T and encoding processing amount in the encoding processing by the error correction encoding section and the first line quality information calculated by the line quality measuring section to the transmitted data packet and the error correction encoded packet, respectively; and a packet transmitting section that transmits the transmitted packet generated by the transmitted header processing section, wherein the packet transmitting section transmits the transmitted packet subjected to the error correction encoding processing such that packet transmitting intervals are equal for each of the encoding time T.

15. A communication method comprising the steps of:

calculating first line quality information including a first burst loss time based on packet defects of a received packet;

restoring the defects of the received packet based on an encoding time T and an encoding processing amount, which is an encoded block parameter, included in an error correction header of the received packet;

acquiring a second line quality information including a second burst loss time $T_{BL}$ from the error correction header of the received packet;

setting variably or fixedly the encoding time T based on the acquired second line quality information, and measuring the number of packets N per encoding time T of a transmitted data packet;

deriving the encoding processing amount based on the measured number of packets N, the encoding time T set by a packet number measuring section, and the acquired second line quality information, and generating an error correction encoded packet including error correction codes calculated by the encoding processing amount; and generating a transmitted packet by imparting the error correction header including the encoding time T and encoding processing amount in the encoding processing and the calculated first line quality information to the transmitted data packet and the error correction encoded packet, respectively, wherein a packet transmitting section transmits the transmitted packet generated by a transmitted header processing section, and the packet transmitting section transmits the transmitted packet subjected to the error correction encoding processing such that packet transmitting intervals are equal for each of the encoding time T.

* * * * *